United States Patent [19]

Flygenring

[11] 4,088,271

[45] May 9, 1978

[54] NEEDLE-VALVE FOR HOT RUNNER INJECTION MOULDING

[76] Inventor: Eduard Freddy Flygenring, Snebaervej 1, Kr.Sonnerup, 4060 Kr. Saby, Denmark

[21] Appl. No.: 729,849

[22] Filed: Oct. 5, 1976

[30] Foreign Application Priority Data

Oct. 10, 1975 Denmark ............................ 4561/75

[51] Int. Cl.² ............................................. B05B 1/30
[52] U.S. Cl. .............................. 239/533.1; 239/533.6; 239/584; 425/562
[58] Field of Search ............... 239/584, 533.1, 533.9, 239/453, 533.6, 118, 117; 425/562, 564, 566

[56] References Cited

U.S. PATENT DOCUMENTS

| | | | |
|---|---|---|---|
| 3,023,458 | 3/1962 | Seymour | 425/566 |
| 3,398,936 | 8/1968 | Delano | 239/453 |
| 3,434,667 | 3/1969 | Chmura | 239/453 |
| 3,469,793 | 9/1969 | Guertler | 239/453 |
| 3,491,408 | 1/1970 | Natkins | 425/564 |

*Primary Examiner*—Evon C. Blunk
*Assistant Examiner*—Michael J. Forman
*Attorney, Agent, or Firm*—Stevens, Davis, Miller & Mosher

[57] ABSTRACT

Needle-valves to be inserted in a hot runner panel of an injection moulding machine for the distribution of the molten material to a plurality of dies fastened to the front of a hot runner panel and which are opened by the pressure of the molten material and closed by a spring by the releasing of the pressure. The construction of the valves being so that they as a unity may be easily inserted, removed and adjusted from the backside of the hot runner panel without disassembling the dies from the moulding machine. Further the valve is provided with an adjustable abutment in an enclosed space which will not be contaminated by the molten material to ensure exact position of the needle in its open and closed position.

9 Claims, 4 Drawing Figures

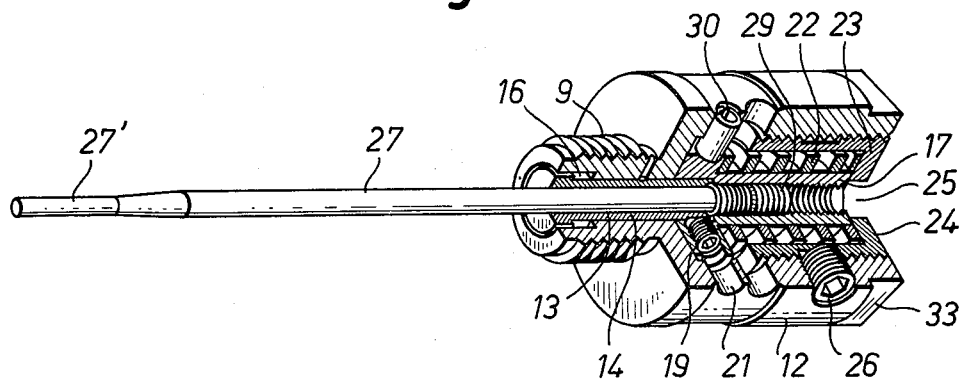
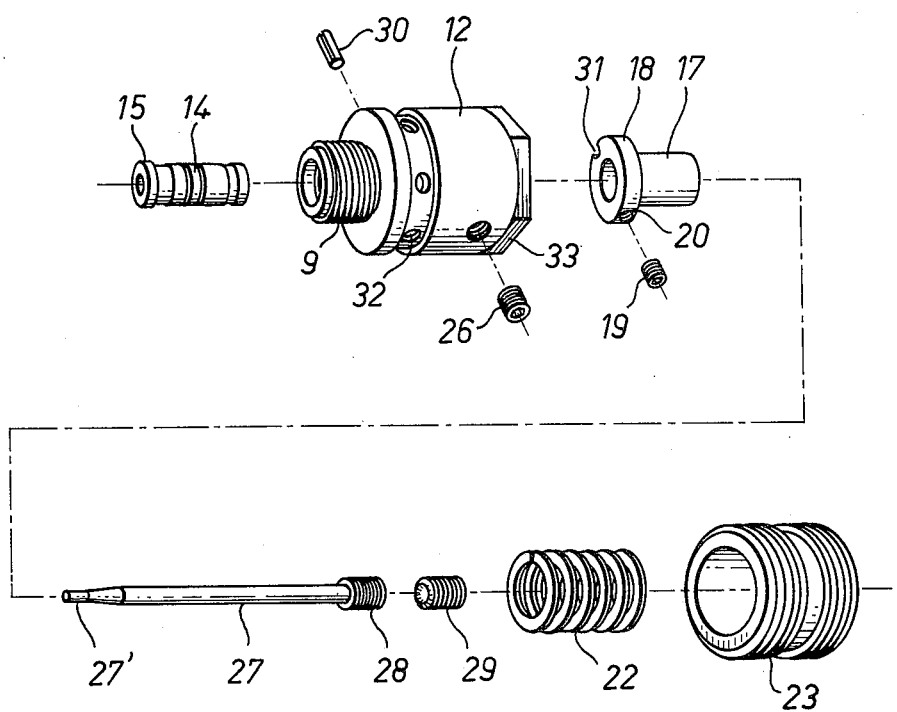

NEEDLE-VALVE FOR HOT RUNNER INJECTION MOULDING

BACKGROUND OF THE INVENTION

It is common practice by injection moulding of thermoplastics or like material to provide the discharge orifice to the dies with needle-valve to avoid formation of a sprue on the article to be produced. The needle-valves are arranged to close the discharge orifice by the end of the injection and by starting the injection the needle will automaticly be retracted from the discharge orifice by the pressure of the molten material against the action of spring means which will return the needle to the closing position when the pressure ceases.

By dies for great articles and especially dies for the producing of a great number of small articles the die will be provided with a plurality of discharge orifices and the molten material which under high pressure is delivered from the injection moulding machine is delivered to orifices through a hot runner panel which is a rather solid element with distribution channels and heating elements to ensure the proper temperature of this component.

For adjusting or removing the needle-valves it has generally been necessary to disassemble the dies and the hot runner panel and it has also been difficult to obtain adequate sealing against the high pressure by which the molten material is introduced in the dies, so that it could not be avoided that a small part of the molten material seeps out and solidifies on the outer surface of the dies which may necessitate a frequent and cumbersome cleaning. Further the tip of the needle generally is arranged for in the closed position to cooperate with a frusto-conical seat in the discharge orifice, so that when molten material solidifies on this seat it would not be possible to maintain the desired closing position of the needle.

SUMMARY OF THE INVENTION

Accordingly a broad object of the present invention is to overcome the aforementioned prior art shortcomings by providing an improved needle-valve for hot runner injection moulding which as a complete unity may be easily inserted, removed as well as adjusted from the backside of the hot runner panel without disassembling the same from the dies or the moulding machine.

Another object of the present invention is to provide a neddle-valve of the kind referred to which is of a simple and reliable construction and having small dimensions in the plane perpendicular to its axis. A further object of the invention is to provide a needle-valve of the kind referred to which will effectively seal the molten material under high pressure from the interior moveable parts of the needle-valve and especially so as to avoid that solidified particles of the molten material may dislocate the proper end positions of the moveable needle.

To achieve the foregoing and other obvious objects of the invention, both stated and unstated hereinafter, the invention provides a needle-valve of the kind referred to comprising an axial adjustable needle mounted in a co-axially first and second bushing, said bushings being slideable mounted in a housing, said housing having at its forward end a screw thread stud for inserting in the backside of the machines hot runner panel, means for interconnecting said first bushing to said second bushing after inserting in the housing, said first bushing having at its forward end protruding abutment means for engaging the forward end of the housing in the retracted position of the needle, said second bushing having at its forward end a protruding flange arranged for in the needle's closed position to rest with its frontside against the housing and with its backside engaging the one end of spring means surrounding said second bushing, the other end of said spring means engaging a spring support axially adjustable inserted in the housing from the backside of the same.

Other objects of the invention more or less broad that the foregoing will become apparent from the hereinafter following description of the elements of the invention given herein solely by way of example and with reference to the accompanying drawings.

BRIEF DESCRIPTION OF THE DRAWINGS

FIG. 2 is a partly sectional view of the needle-valve;

FIG. 3 an exploded view of the parts forming the valve shown in FIG. 2, and

DESCRIPTION OF THE PREFERRED EMBODIMENT

Figure 1:
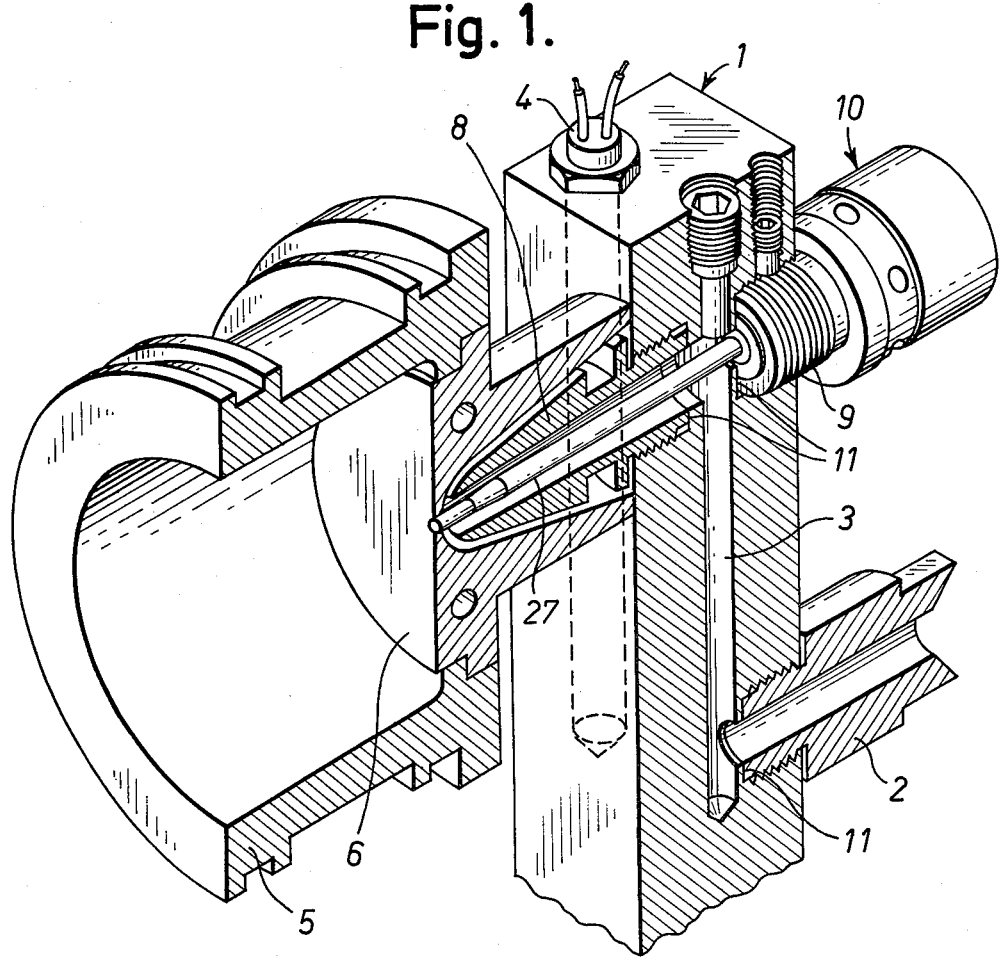
FIG. 1 is a sectional view of a hot runner panel with a die and a cooperating needle-valve inserted in the panel.

The use of the preferred embodiment of the needle-valve according to the present invention is illustrated generally in FIG. 1. Therein appears a hot runner panel 1 with a supply tube 2 for the molten material and 3 indicates one of the distributing channels. A part of a die is shown generally by 5 and in the central part of the bottom 6 of the die-cavity is provided an orifice for injection of the molten material which under high pressure is supplied through a pipe 2, the distributing channel 3 and an injection nozzle 8 of a material with high thermal conductivity as e.g. copper, and which from the front is screwed into the hot runner panel.

Co-axially with the nozzle 8 a needle-valve aggregate generally indicated by 10 is inserted from the backside into the hot runner panel 1 by means of screw thread stud 9. The components screwed into the hot runner panel 1 are sealed by means of packing rings 11. By proper adjustment the forward flat end-surface of the needle flushes with the bottom 6 of the die. By initiating the injection the pressure of the molten material will force the needle a distance generally about ⅛ inch backwards to open the orifice for injection of molten material in the die and when the pressure ceases the spring means will return the needle to its closing position.

Figure 4:
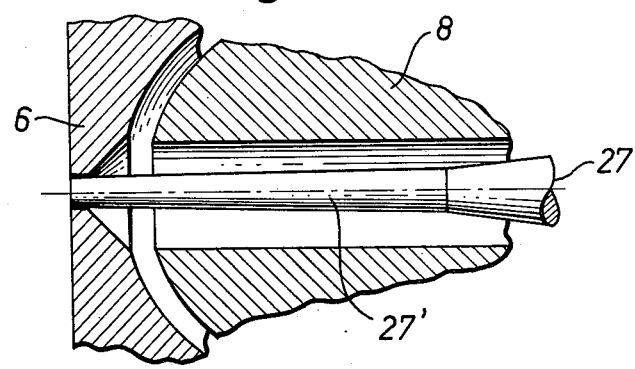
FIG. 4 an enlarged sectional view of the discharge orifice and the tip of the needle.

The needle-valve proper is shown in FIGS. 2-4 and comprises a valve-housing 12 at its forward end provided with a screw thread stud 9 and with a central bore 13 wherein is slideable mounted a first bushing 14, at its forward end provided with a protruding flange 15. The bore 13 may in its forward end have a counter-bore 16 wherein the flange 15 is displaceable with some clearance.

To the backward end of the bushing 14 a second bushing 17 is attached which at its forward end has a protruding flange 18. The two bushings 14 and 17 are mutually connected after being placed in the housing by inserting a setscrew 19 through a passage 20 in the flange 18. To make this possible the housing 12 is provided with a passage 21.

A helical spring 22 surrounding the bushing 17 rests with its forward end against the flange 18 held in position by means of tube-like spring support 23 at its backward end provided with an internal flange 24 with a central aperture 25 with a hexagonal outline so that the spring support 23 may be screwed in position by means of a hexagonal key to compress the spring. When the spring support is in the desired position it is locked by means of a setscrew 26 which may also be arranged to be operated by a hexagonal key.

The needle 27 has at its backward extremity a protruding thread 28 and in the backward surface a bore with hexagonal cross-section so that it may be operated by means of a hexagonal key. The needle is arranged for being inserted in the bushings 14 and 17 from the backside of the spring support through the aperture 25 and screwed into a corresponding internal thread in the bushing 17, until it has reached the desired position in axial direction. It is locked in this position by screwing in a lockscrew 29 which may also be arranged for operating by a hexagonal key. To ensure that the needle will maintain its position by screwing in of the lockscrew 29 the front of the same is ground plane and the same is the case with the backside of the needle 27. Further the bushings 14 and 17 are locked against turning in relation to housing 12 by inserting a tap 30 in the same, said tap being slideable in a groove 31 cut out in the flange 18 in axial direction.

For inserting the needle-valve in the backwall of the hot runner panel 1 the valve-house may be provided with peripherically arranged holes 32 for cooperating with a special key as shown in the drawing or the backward end of the housing may be provided with a hexagonal 33.

Further modifications and alternative embodiments of the invention will be evident to those skilled in the art in view of this description. Various changes may be made in the shape, size and arrangement of parts. E.g. instead of the helical spring 22 shown, another form of springs e.g. belleville-springs may be used. The parts arranged for being operated by a hexagonal key may be arranged for being operated by other forms of tools e.g. screwdrivers. Futher the counter-bore 16 may be omitted so that the backward surface of the flange 15 in the retracted position of the needle may seal directly against the front surface of the screw thread stud 9.

What is claimed is:

1. A needle-valve for an injection moulding machine's discharge orifices to the dies, said machine having a hot runner panel, and which is closed by spring means and opened by the pressure of the molten material, comprising an axial adjustable needle mounted in a co-axial, longitudinally aligned first and second bushings for simultaneous movement, said bushings being slideably mounted in a housing, having at its forward end a screw thread stud for inserting in the backside of the machine's hot runner panel, means for inter-connecting said first bushing to said second bushing after inserting in the housing, said first bushing having at its forward end protruding abutment means, the backward end of said abutment means engaging the forward end of the housing in the retracted open position of the needle, said second bushing having at its forward end a protruding flange arranged for in the needle's extended closing position to rest with its front end against the housing and with its backside engaging the one end of spring means surrounding said second bushing, the other end of said spring means engaging a spring support longitudinally axially adjustably inserted in the housing from the backside of the same.

2. A needle-valve as defined in claim 1 wherein: the abutment means on the front end of the first bushing is a flange, the backward side of said flange of said first bushing is adapted for a close tolerance fit with a corresponding surface of the housing.

3. A needle-valve as defined in claim 2 wherein: the housing at its forward end has a counter-bore, wherein the flange on the first bushing is longitudinally displaceable within said counter-bore and the bottom of said counter-bore is machined for sealing engagement of the backward side of the flange of said first bushing.

4. A needle-valve as defined in claim 1 wherein: the forward end of the needle is cylindrical with a diameter corresponding to that of the discharge orifice to the die.

5. A needle-valve as defined in claim 1 wherein: the needle at its backward end is provided with a protruding thread so that the needle can be inserted in the second bushing from the backside of the same and screwed into a corresponding internal thread in said second bushing.

6. The invention as defined in claim 5 wherein: a lockscrew is inserted in said second bushing to lock the needle when in the desired position.

7. The invention as defined in claim 1 wherein: a flange on the second bushing at its periphery has an circumferentially directed groove for cooperating with a tap (30) inserted in the housing.

8. The invention as defined in claim 1 wherein: a setscrew is screwed in a radial bore with internal threads in the flange of the second bushing for locking this to the backward end of the first bushing when inserted in said second bushing.

9. The invention as defined in claim 8 wherein: the housing is provided with a passage for inserting the setscrew into the flange of the second bushing.

* * * * *